United States Patent
Pioch, deceased et al.

[11] Patent Number: 5,258,594
[45] Date of Patent: Nov. 2, 1993

[54] HIGH FREQUENCY HEATING PROCESS FOR IMPREGNATING OR POLYMERIZATION OF TRANSFORMER WINDINGS

[76] Inventors: Rene Pioch, deceased, late of Carros Cedex, France; by Sylvie Pioch, heir, Carros Industries, Lere Avenue, 3 eme rue, F-06515 Carros Cedex, France; by Colette Cahulau, heir, 69, Corniche Fleurie, F-06200 Nice, France; by Isabelle Pioch, heir, Tartamiel, Emiliano Zappata No. 306, Col. Reforma, 68050 Oaxaca, Mexico; by Evelyne Pioch, heir, 44, avenue de la Marne, Imm. E. Dimiez-le-Haut, F-06100 Nice, France; by Olivier Pioch, heir, 69, Corniche Fleurie, F-06200 Nice, France

[21] Appl. No.: 720,516
[22] PCT Filed: Oct. 12, 1990
[86] PCT No.: PCT/FR90/00739
  § 371 Date: Jul. 8, 1991
  § 102(e) Date: Jul. 8, 1991
[87] PCT Pub. No.: WO91/07764
  PCT Pub. Date: May 30, 1991

[30] Foreign Application Priority Data
Nov. 9, 1989 [FR] France ................. 89 14872

[51] Int. Cl.⁵ ............................. H05B 6/10
[52] U.S. Cl. .................... 219/10.41; 219/10.57; 219/10.77; 29/602.1; 148/567; 427/543
[58] Field of Search ............. 219/10.41, 10.43, 10.57, 219/10.75, 10.77; 29/602.1, 606, 607; 148/108, 121, 567; 427/487, 543, 544, 591

[56] References Cited

U.S. PATENT DOCUMENTS

| | | | |
|---|---|---|---|
| 3,233,311 | 2/1966 | Giegerich et al. | 29/605 |
| 4,249,068 | 2/1981 | Mangan et al. | 219/497 |
| 4,355,221 | 10/1982 | Lin | 219/10.43 |
| 4,649,248 | 3/1987 | Yamaguchi et al. | 219/10.57 |
| 4,812,608 | 3/1989 | Alexandrov et al. | 219/10.75 |

Primary Examiner—Philip H. Leung
Attorney, Agent, or Firm—Mason, Fenwick & Lawrence

[57] ABSTRACT

This invention relates to a high frequency heating process for treating a transformer core and windings. The process includes the steps of maintaining vacuum in an enclosure wherein the windings are to be treated, heating the windings with high frequency current, measuring the insulation resistance of the windings until a constant value is reached, stopping heating, filling the enclosure with oil, and then drying the oil from the enclosure. Alternatively, the transformer core and windings can be treated by encapsulating the winding with a polymerized resin, allowing the resin to flow into the mould and against the sides of the winding in a controlled fashion to enable polymerization of the resin to spread horizontally in a thin layer.

10 Claims, 3 Drawing Sheets

HIGH FREQUENCY HEATING PROCESS FOR IMPREGNATING OR POLYMERIZATION OF TRANSFORMER WINDINGS

BACKGROUND OF THE INVENTION

The useful life of a transformer largely depends on the drying process, both of the dielectric liquid wherein the windings are immersed and of its solid insulating materials, which, furthermore, must not have been damaged by the heating to which they have been subjected to be dried. In the same way, no air bubble can be permitted to subsist, or to be trapped during the filling-impregnation-polymerization process.

For immersed transformers, a two stage process is performed: firstly, a drying treatment in an oven, air or kerosen heated, whose duration depends on the importance of the transformer, but always exceeds several hours, and can reach several days.

With the increase of the production all over the world, the vacuum drying devices have been left, because they were too expensive, compared with the hot air drying ones. Only the oil filling stage is performed under vacuum, in small autoclaves that just contain a few transformers. However, the quality and swiftness of the vacuum drying treatment are admitted and missed. There are some low frequency heating techniques, performed under vacuum, but, as with the previous systems, their cost has prevented them from spreading.

For the power transformers that have tanks able to withstand vacuum, the two stages are directly performed in the shut or welded tank. The drying is performed through a succession of heatings followed by settings under vacuum. This process lasts several days. The oil filling under vacuum follows the drying stage.

Numerous small repairers or manufacturers do not possess vacuum filling devices because of their cost, which is very high regarding their capacity. None of the methods or devices commonly used can really be automatically driven or controlled. The manufacturers still take into account a high safety coefficient, empirically determined, that brings about production costs that are higher than one could except, especially in the developing countries, where needs are more important.

SUMMARY OF THE INVENTION

The invention relates to a process that brings a reliable and economical solution whatever the type or importance of the production may be.

DESCRIPTION OF THE PREFERRED EMBODIMENTS

Figure 1:
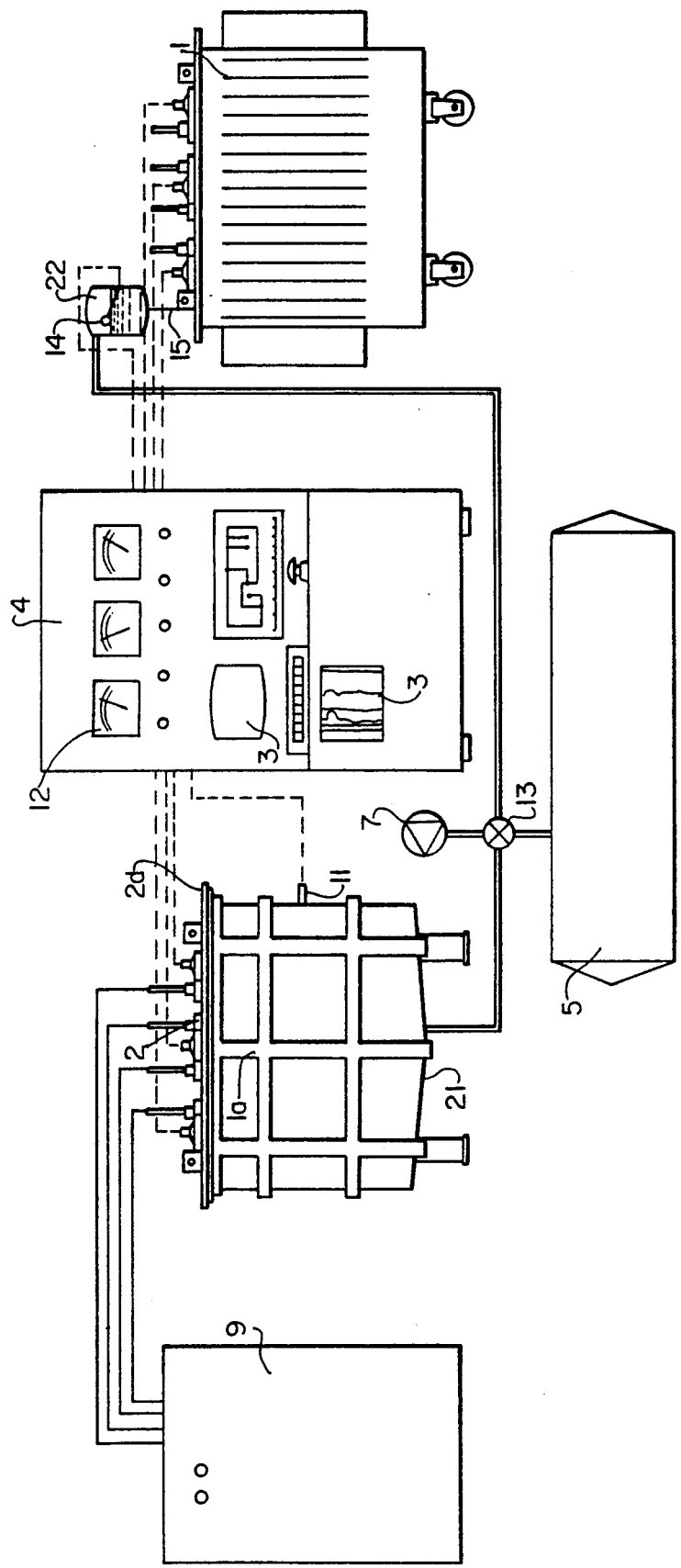
FIG. 1 is a perspective view of a false tank wherein the core and coils are placed. The false-tank is connected by a three-way oil gate to a vacuum pump, an oil reserve, a generator and a driving and control cabinet.
Figure 2:
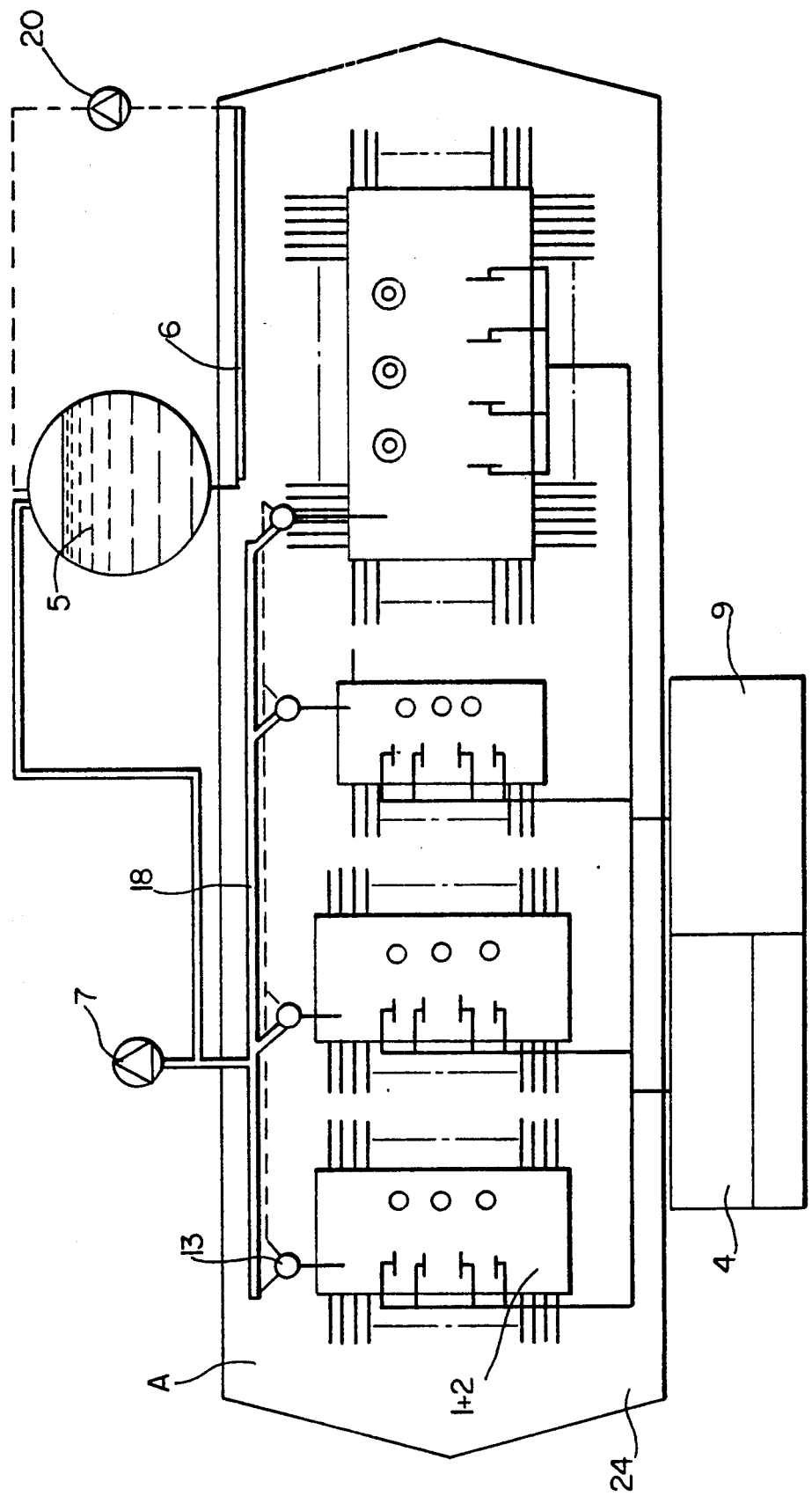
FIG. 2 is a perspective view of an autoclave which is connected to a generator, a driving and control cabinet, an oil reserve, an oil drying device and a result recording set.

The present invention relates to a process that consists in drying the core and coils (2) by supplying the LV windings with a HF current provided by a generator (9) in order to induce losses by Eddy currents. Both frequency and intensity of the current are determined for each type of transformer either by a diagram or by an automation.

Heating starts then within the windings (8) and propagates by contact both towards the periphery (HV windings) (8a) and the inner part (magnetic core) (10). Heating being performed under vacuum, all the losses by thermal radiation are practically suppressed, hence noticeable savings in energy; The three windings being connected to control devices, such as a thermostat (11) and a megohmeter (12), it is possible to control the temperature, so that it could never exceed the limit temperature of the solid insulating materials (class B 105° C. for instance) result recording sets can also be added.

The drying quality is controlled by the megohmeter that indicates the insulation resistance, which enables to follow the drying process, but above all to stop it as soon as it is sufficient, that is to say when the insulation resistance has reached a constant value. At that moment, the automation or an operator, advised by a signal, stops the heating stage, and starts the oil filling by connecting the oil reserve (5) to the tank (1) by operating the oil gate (13) of the transformer. The core and coils temperature is approximately 100° C., the impregnation is very good, as the insulating materials are dilated and oil fluidity has increased because oil is heated by conductivity or as explained below. The level sensor (14) with which the admission system (15) is equipped enables putting the oil inside the tank under a pressure that is determined by the windings and oil temperature and calculated by the automation.

Of course, insulation resistance keeps on being measured during oil filling, notably to make sure that no bubble has been trapped. Against one or several walls of the autoclave is placed an oil drying device. This one is composed of a spout (16) for introducing oil. Oil runs down on both sides of a panel (17) made of woven material or fine grating, showing thus an exchange surface about twice that of the panel under a weak thickness (slit of the spout). At the lower part of the panel, a gutter (19) is placed to collect the oil that is transferred to the lower part of a reserve (5) in order to be pumped by a pump (20), either to be treated again, or to fill the tanks. Oil insulation resistance is continuously measured in the gutter so that the treatment should be stopped when the desired value is reached. Since this operation is performed in "blind time", it can be continued until tank filling starts. It is also possible to heat the panel, as there will not be any heat radiation to make the drying easier, the whole being performed under vacuum.

Should a false-tank (FIG. 1) be used, this is the transformer's cover (2d), to which the core and coils (2) are bolted, which is used as a cover. The bottom (21) of this false-tank is connected by a three-way oil gate (13) to the vacuum-pump (7) and to the oil reserve (5). The process is the same as the previous one, but after having filled the false-tank and impregnated the windings (control of the insulation resistance), the tank is emptied and the core and coils are put in their own tank. A spout avoids oil dropping down. After the transformer's cover has been fixed, oil filling is completed through a small tank (22) which is connected to the filling aperture, and which enables to check visually that the level remains constant and that there is no bubble escape from the tank. The terminals of the transformers are still connected to the control devices in order to measure the insulation resistance. The vacuum pump is stopped when the resistance level is satisfactory. Oil volumes being small, it is possible to equip one or two walls of the false-tank with the oil drying device (6) previously described.

With this process, heating and drying are extremely quick, and the time required for the treatment is 1/7 to 1/5 of that of the traditional methods. On the other hand, the vacuum volume is low, as the false-tank is designed for only one transformer. It is advantageous to make the false-tanks according to the different needs and to design different sizes, their construction is quite easily adaptable to the vacuum pump, the heating and control unit.

In the case of important productions, having stove for the drying treatment and autoclaves for oil filling under vacuum, it is possible to equip these autoclaves (A) in order to perform the whole drying and filling process. However, this process being longer than the only filling stage, a second autoclave must be foreseen. But time savings are such, that a second autoclave is generally sufficient, which considerably reduces the investment cost, as an important part to be recovered.

Figure 3:
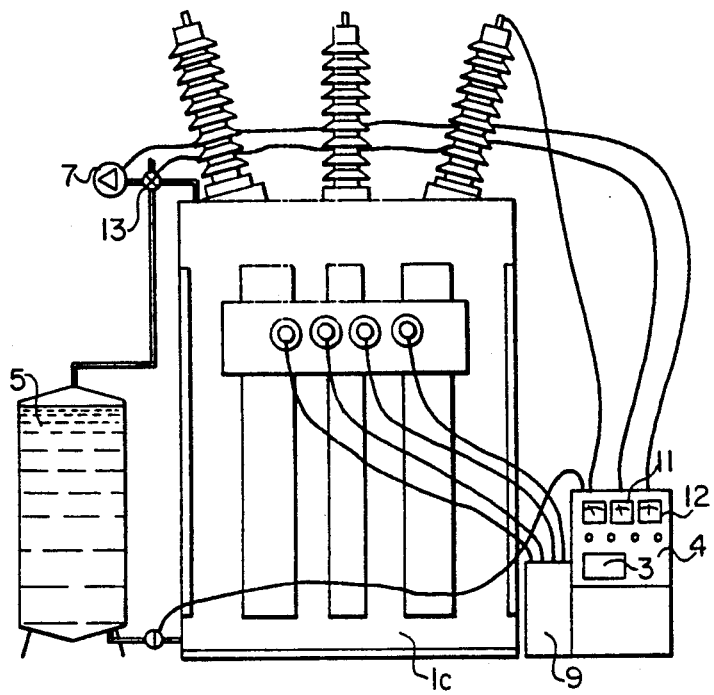
FIG. 3 is perspective view of a transformer with its own tank. The tank is connected to a generator, a driving and control cabinet, an oil reserve, a vacuum pump and a result recording set.

This is also the case for the power transformers (FIG. 3), for only the HF generator and the control and driving units must be supplied, the other necessary elements (vacuum pump, oil reserve, ...) being already used.

In the case of cast resin transformers, the process can be used for the polymerization of epoxy resins under vacuum. It is possible in that case to act upon the polymerization rate, therefore upon the stresses which develop during the polymerization stages.

When the polymerization process must be performed under vacuum, the moulds are heated. Even if the fact that their fabrication is more complicated is not taken into account, polymerization, and thus hardening occurs first at the periphery and spreads from the outward inwards. The windings have then to withstand all the stresses, which is but the case with the patented process. More generally, the mould is filled under vacuum and placed in a stove in which the totality of the resin is polymerized. Weak points, such as supporting and centering bridges appear, that, although being of the same material, exhibit interfaces where creeping and microcracks can develop.

Figure 4:
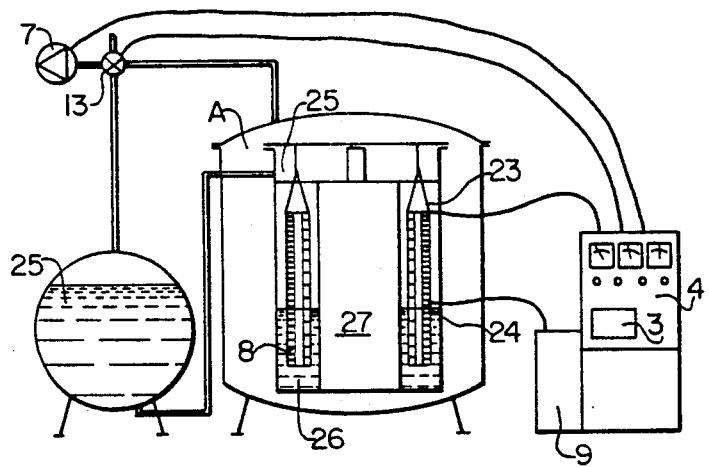
FIG. 4 is a perspective view of a cast resin transformer wherein windings are placed in their mould and suspended by isolating straps. The winding is connected to a generator and a vacuum pump.
Figure 5:
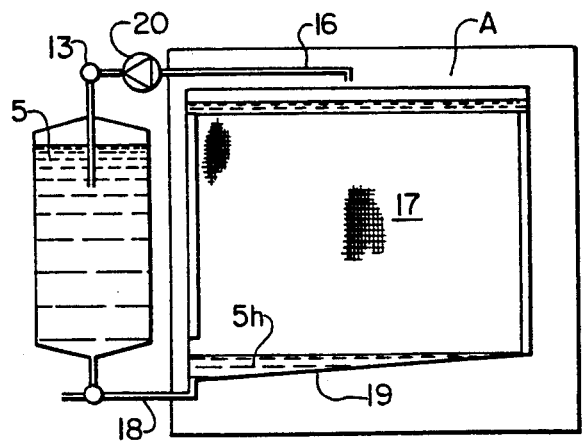
FIG. 5 is a perspective view of an autoclave which comprises a spout, a panel, and a gutter.

With the present process, the windings to be encapsulated (FIG. 4) are placed in their moulds (27), suspended by isolating straps (23). The tapchanger terminals (24) help to immobilize and to center the windings, though the straps judiciously placed would be sufficient for that purpose. The winding is connected to the generator (9). The autoclave is shut, and the vacuum pump is switched on. After the drying stage controlled by the insulation resistance measurement and the maintaining of the vacuum, the resin (25) is allowed to flow against the walls. The flow is such as the polymerization spreads horizontally, in a thin layer. In that way, there will never be a big volume in polymerization phase.

Another advantage of the process is that it is possible, when a large part of the windings is already encapsulated (26), to cut or to let the straps fall into the mould by the mean of a simple remote-controlled operation. The straps will be then also encapsulated. It is then possible to obtain encapsulated windings without any mechanical bridge with the outside, which would entail creeping risks and would compel to increase noticeably the resin thickness along the vertical walls and particularly in the lower part.

Thus, this process, according to its flexibility, can be adapted to all the transformers manufacturers, whatever their production capacity may be, in order to improve quality in economical conditions.

We claim:

1. A process for treating a transformer core and windings, comprising the steps of:
   a) providing low and high voltage transformer windings and a transformer core in an enclosure;
   b) evacuating the enclosure and maintaining a vacuum therein;
   c) heating the windings and the core by supplying the low voltage windings with a high frequency current;
   d) controlling the temperature of the windings and the core so that their temperature does not exceed a predetermined maximum;
   e) measuring the insulation resistance of the windings and ceasing the supply of high frequency current when the insulation resistance reaches a constant value;
   f) impregnating the coils and the core with oil by filling the enclosure with oil.

2. The process of claim 1, wherein in said step d), the predetermined maximum temperature is the limit temperature of the solid insulation of the windings and the core.

3. The process of claim 1, wherein in said step f), the oil is introduced into the enclosure under pressure.

4. The process of claim 1, wherein said steps e) and f) take place simultaneously.

5. The process of claim 1, further comprising the steps of:
   g) providing a heater in the enclosure; and
   h) simultaneously with said step f), drying the oil in the enclosure using the heater.

6. The process of claim 1, wherein in said step a), the enclosure is an autoclave, and the windings and the core are provided in a complete transformer which is placed in the enclosure.

7. The process of claim 1, wherein in said step a), the enclosure is a false tank and only the windings and the core of the transformer are placed in the enclosure; and wherein said process further comprises the steps of:
   g) following said step f), emptying the enclosure;
   h) following said step g), placing the windings and the core in a second tank; and
   i) following said step h), filling the second tank with oil.

8. The process of claim 7, further comprising the step of:
   j) simultaneously with said step i), measuring the insulation value of the oil in the second tank, and ceasing filling of the second tank when the insulation value of the oil reaches a predetermined value.

9. A process for treating a transformer core and windings, comprising the steps of:
   a) suspending a transformer winding in a mould placed in an enclosure;

b) evacuating the enclosure and maintaining a vacuum therein;
c) heating the winding by supplying the winding with a high frequency current;
d) measuring the insulation resistance of the winding and ceasing the supply of high frequency current when the insulation resistance reaches a constant value; and
e) encapsulating the winding with a polymerized resin.

10. The process of claim 9, wherein said step e) comprises allowing a resin to flow into the mould and against the sides of the winding in a controlled fashion to enable polymerization of the resin to spread horizontally in a thin layer.

* * * * *